(12) United States Patent
Hiller et al.

(10) Patent No.: US 10,461,691 B2
(45) Date of Patent: Oct. 29, 2019

(54) SOLAR TESTING DEVICE

(71) Applicant: PASAN SA, Neuchatel (CH)

(72) Inventors: Jonas Hiller, Bern (CH); Slim Prince, Cudrefin (CH)

(73) Assignee: PASAN SA, Neuchatel (CH)

( * ) Notice: Subject to any disclaimer, the term of this patent is extended or adjusted under 35 U.S.C. 154(b) by 108 days.

(21) Appl. No.: 15/571,911

(22) PCT Filed: Mar. 24, 2016

(86) PCT No.: PCT/IB2016/051681
§ 371 (c)(1),
(2) Date: Nov. 6, 2017

(87) PCT Pub. No.: WO2016/178102
PCT Pub. Date: Nov. 10, 2016

(65) Prior Publication Data
US 2018/0091093 A1    Mar. 29, 2018

(30) Foreign Application Priority Data

May 5, 2015 (EP) ..................................... 15166463

(51) Int. Cl.
| | |
|---|---|
| G01R 31/26 | (2014.01) |
| H02S 50/15 | (2014.01) |
| F21V 14/04 | (2006.01) |
| F21S 8/00 | (2006.01) |
| F21Y 105/12 | (2016.01) |
| F21Y 105/10 | (2016.01) |

(52) U.S. Cl.
CPC .............. *H02S 50/15* (2014.12); *F21S 8/006* (2013.01); *F21V 14/04* (2013.01); *F21Y 2105/10* (2016.08); *F21Y 2105/12* (2016.08)

(58) Field of Classification Search
CPC .......... H02S 50/10; H02S 50/15; F21V 14/04; F21S 8/006; G01R 31/26; G01R 31/2605
See application file for complete search history.

(56) References Cited

U.S. PATENT DOCUMENTS

| | | |
|---|---|---|
| 2011/0241549 A1 | 10/2011 | Wootton |
| 2013/0063174 A1 | 3/2013 | Ooto et al. |
| | (Continued) | |

FOREIGN PATENT DOCUMENTS

| | | | |
|---|---|---|---|
| EP | 2589861 A2 | 5/2013 | |
| JP | 2004281706 A | * 10/2004 | ............. H02S 50/10 |

OTHER PUBLICATIONS

JP 2004281706 Translation.*

*Primary Examiner* — Minh N Tang
(74) *Attorney, Agent, or Firm* — Nadya Reingand; Yan Hankin

(57) ABSTRACT

The invention refers to a solar testing device (11) for testing a solar module (6). The solar testing device (11) comprises a test area (12) for the solar module (6) to be tested, a light emitting area (16) comprising an array of LED-modules (17, 17A) arranged opposite to the test area (12) and arranged in a pitch (P) to each other. Further the solar testing device (11) comprises sidewall mirrors (21) extending in the direction from the light emitting area (16) to the test area (12). Guides (26) are provided having each an abutting surface (27) for supporting the solar module (6) whereby the abutting surfaces (27) of the guides (26) lie in the plane (A) of the test area (12).

17 Claims, 3 Drawing Sheets

(56) References Cited

U.S. PATENT DOCUMENTS

2013/0069687 A1 3/2013 Ooto et al.
2013/0328587 A1* 12/2013 Linden .................. H02S 50/10
                                                            324/761.01

* cited by examiner

SOLAR TESTING DEVICE

CROSS-REFERENCE TO RELATED APPLICATIONS

The present patent application is a National stage application from PCT application PCT/IB2016/051681 filed on Mar. 24, 2016 which claims priority to European Patent Application EP15166463.8 filed on May 5, 2015.

FIELD OF THE INVENTION

The invention refers to a solar testing device, also called a sun-simulator or flasher, for testing a solar cell or a solar module according to the preamble of claim 1.

BACKGROUND FOR THE INVENTION

A solar module consists of an assembly of electrically connected solar cells. For testing such solar cells or solar module the active surface is lighted and the output is compared to a respective nominal (target) value.

US 2013/0328587 A1 shows a solar testing device for testing solar cell or solar module comprising a test area for at least one solar cell or solar module to be tested, a light emitting area comprising an array of LED-modules, arranged opposite to the test area and arranged in a pitch to each other, and sidewall mirrors, extending in the direction from the light emitting area to the test area. The solar cell or the solar module is placed with its active surface on a test plane glass that defines the test area.

For providing valuable and reliable solar modules on the market the testing must be of a very high level. According to US 2013/0328587 A1 it is especially difficult and laborious to obtain a homogenous illumination of the solar modules.

SUMMARY OF THE INVENTION

The object of the present invention is to provide a solar testing device which does not have the aforementioned disadvantages and especially has higher testing quality.

This object is achieved by the features of the independent claim. Advantageous further embodiments are shown in the figures and in the dependent claims.

According to the invention the ratio between the distance between the light emitting area and the test area and the pitch of the LED-modules lies in a range of 1.5 to 3.5. Thereby a perfect lighting is guarantees. More preferably the ratio lies in a range of 2.3 to 2.7. Thereby the homogeneous and uniform lighting of the solar cell or the solar module is further improved.

Preferably, the sidewall mirrors are inclined against the light emitting area whereby the angularities of the sidewall mirrors are in opposite directions. In other words, the sidewall mirrors opens relative to each other in a direction from the light emitting area. Thereby the light provided by the LED-modules, especially of the LED-modules arranged adjacent the sidewall mirrors, will be guided to the test area in a preferred manner. By this measure the necessary power for the LED-modules adjacent to the sidewall mirrors can be reduced and only one type of LED-modules can be used in the whole solar testing device. Thereby the costs and the complexity of the solar testing device are reduced.

More preferably the sidewall mirrors are inclined against the light emitting area in an angle between 91° to 95°, preferably 92° to 94°, so that the lighting of the test area is further improved.

Preferably, the sidewall mirrors are pivoted around a pivot or rotation axis. Thereby an easy construction of the solar testing device is possible. Preferably the pivot or rotation axis is arranged at half distance between the light emitting area and the test area.

Preferably, the distance of the center of the LED-module arranged adjacent to the sidewall mirrors and the respective sidewall mirror or its rotation axis lies in a range between 24% to 40%, preferably between 28% to 36%, of the pitch between the LED-modules so that the optimal lightning is guaranteed.

Preferably, the distance between the light emitting area and the test area lies between 300 mm to 500 mm. Thereby a sufficient lighting can be guaranteed with conventional LED modules having a long life time. More preferably, this distance lies between 350 mm to 450 mm whereby LED modules with lower power consumption can be used.

Preferably, the pitch between the LED-modules lies between 148 mm to 168 mm whereby the preferred lighting is guaranteed with conventional LED modules having a long life time. More preferably, this pitch lies between 153 mm to 163 mm whereby LED modules with lower power consumption can be used.

Preferably guides are provided having each an abutting surface for supporting the solar cell or solar module whereby the abutting surfaces of the guides lie in the plane of the test area. Such a solar testing device has an easy structure which guarantees an optimized lighting of the solar cell or the solar module which has to be tested. Furthermore such a solar testing device can be produced at low costs.

Preferably, each guide has a reflecting surface or reflecting surface portions facing the light emitting area, said reflecting surface or reflecting surface portions making an angle with that light emitting area, said angle being an obtuse angle. The result of this reflecting surface or reflecting surface portions is less shading, thus improving homogeneous and uniform lighting of the solar cell or the solar module which has to be tested.

In a preferred embodiment the guides having each a triangular cross section with a reflecting surface or reflecting surface portions which form an angular area inclined to light emitting area. The angular area can also be defined as the area of the longest side of the triangle (e.g. the hypotenuse of a rectangular triangle).

Preferably, the angle of the reflecting surface or reflecting surface portions to the light emitting area or to the abutting surface of the respective guide, respectively, is equal or lower than 45°. Thereby a homogeneous and uniform lighting of the solar cell or the solar module is further improved. More preferably, the aforementioned angle is lower than 25° whereby the lighting of the solar cell or the solar module is furthermore improved.

Preferably, the guides comprise rollers, whereby the outer circumferential surface of the rollers form an abutting surface of the respective guide. The test area is defined by the plane tangentially abutting the circumferential surface of the rollers and being parallel to the light emitting area. Such guides are preferred especially when the area to be tested extends to the outer edge of the solar cell or the solar module, because the rollers provide less shadowing than an abutting surface which extends linear along the respective edge.

Preferably, projections extend from the abutting surface of the guides for guiding the solar cell or the solar module between them. The projections guide the solar cell or the solar module on the test area at least in a lateral direction of the solar testing device and guarantee the testing of the solar cell or the solar module in a reliable manner.

BRIEF DESCRIPTION OF DRAWINGS

Further embodiments of the invention are indicated in the figures and in the dependent claims. The list of reference numerals forms part of the disclosure. The invention will now be explained in detail with respect to the drawings. In the drawings:

DESCRIPTION OF PREFERRED EMBODIMENTS

The present invention will be described with reference to exemplary embodiments and is not limited to particular interconnectors, devices, use or methods, except as defined in the appended claims. Embodiments of the present invention may be used with a variety of methods and systems. It will be apparent to one skilled in the art that the present invention may be practiced in a variety of ways within the scope of the claims. All features shown in relation to the figures may be applied mutatis mutandis to the invention as described in the claims and the claim description.

As used herein, the indefinite article ("a", "an") denotes the presence of at least one of the referenced item, and the term 'a plurality' or 'multiple' denotes the presence of more than one.

In the figures only parts essential for the current invention are shown schematically, for better understanding the invention.

Figure 1:
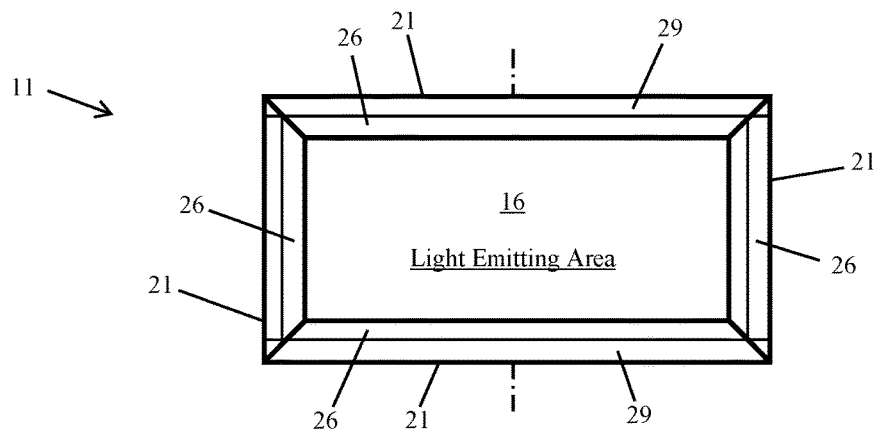
FIG. 1 a first embodiment of a solar testing device according to the invention in a top view, FIG. 2 the solar testing device of FIG. 1 in a plan view, FIG. 3 the solar testing device in a section view along line III-III in FIG. 2, FIG. 4 a second embodiment of a solar testing device according to the invention in a perspective view, FIG. 5 a detail of the solar testing device according to the invention FIG. 4, and FIG. 6 a third embodiment of a solar testing device according to the invention in a sectional view.
Figure 2:
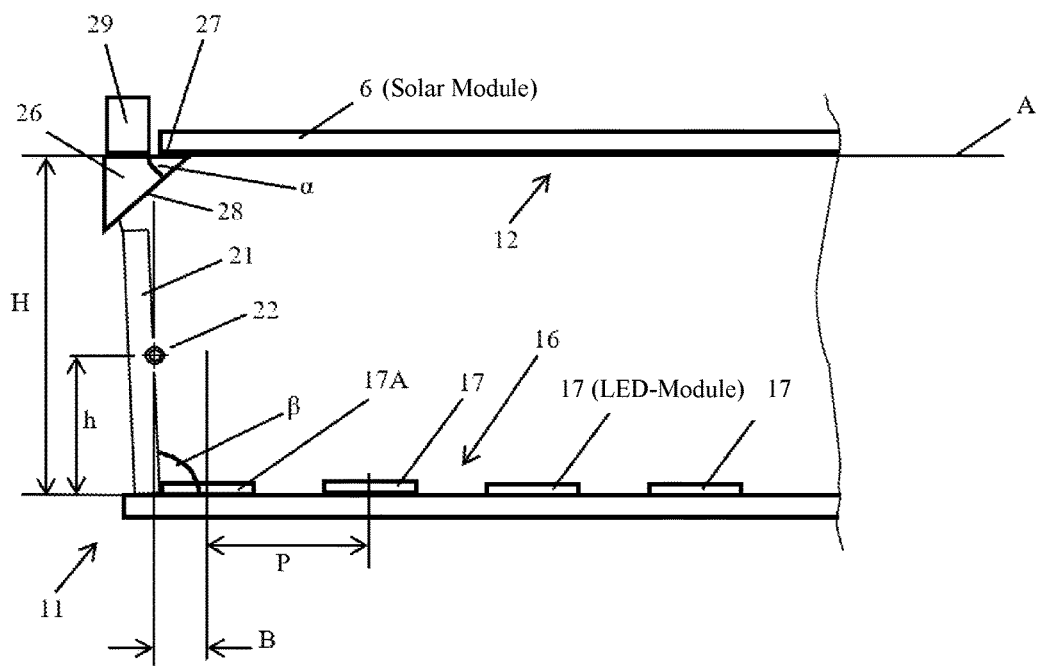
Figure 3:
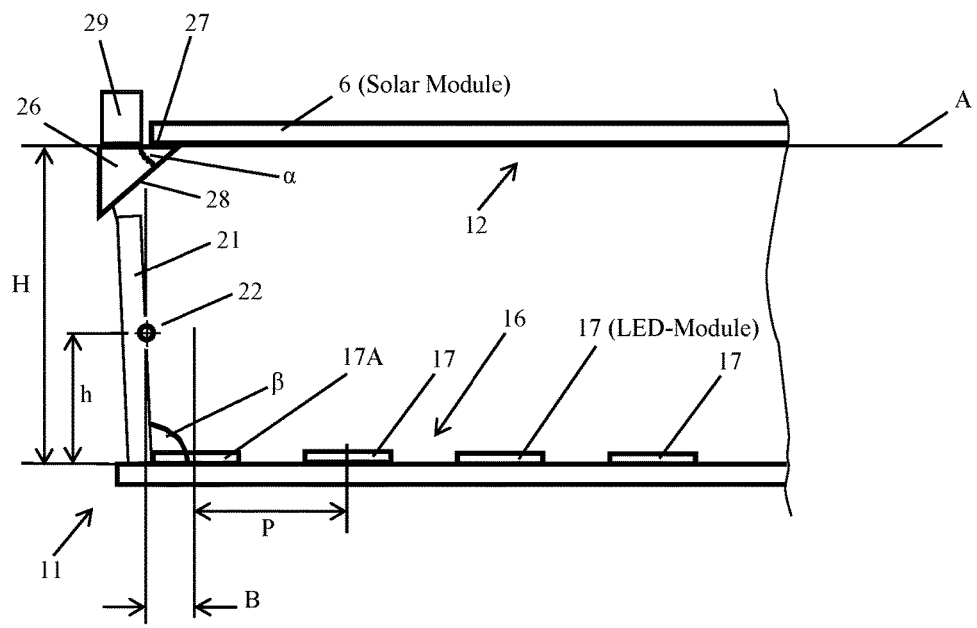

The inventive solar testing device 11 shown in FIGS. 1 to 3 for testing a solar cell or a solar module 6 comprises a test area 12 for at least one solar cell or solar module 6 to be tested and a light emitting area 16 comprising an array of LED-modules 17, 17A which are arranged opposite to the test area 12 and which are arranged in a pitch P to each other. Furthermore, the solar testing device 11 comprises sidewall mirrors 21, extending in the direction from the edges of the light emitting area 16 to the test area 12 whereby the sidewall mirrors 21 open in a direction from each other.

Guides 26 are provided having each an abutting surface 27 for supporting the solar cell or solar module 6. The abutting surfaces 27 of the guides 26 lie in the plane A of the test area 12. The plane A of the test area 12 extends parallel to the plane of the light emitting area 16.

The guides 26 have each a triangular cross section with a reflecting surface 28 or a reflecting surface portion inclined to the light emitting area 16 at an angle α lower than 45°. The reflecting surface 28 corresponds to surface of the longest side of the triangular cross section. The reflecting surface 28 is an inclined angular area which is inclined in respect to the abutting surfaces 27 of the respective guide 26.

Projections 29 extend from the abutting surface 27 of the guides 26 for guiding the solar cell or the solar module 6 between them.

The ratio between the distance H between the light emitting area 16 and the test area 12 and the pitch P of the LED-modules 17, 17A lies in a range of 1.5 to 3.5, preferably in a range of 2.3 to 2.7.

The distance B between the center of the LED-module 17A arranged adjacent to the sidewall mirrors 21 and the respective sidewall mirror 21 lies in a range between 24% to 40%, preferably between 28% to 36% of the pitch P between the LED-modules 17, 17A. The pitch P between the LED-modules 17, 17A lies between 148 mm to 168 mm, preferably between 153 mm to 163 mm.

All four sidewall mirrors 21 are arranged angular to light emitting area 16. The angle β between the plane provided by the light emitting area 16 and the sidewall mirrors 21 lies in the range of 91° to 95°.

The angularities of opposing the sidewall mirrors 21 are in opposite directions. Therefore the distance between the sidewall mirrors 21 adjacent the test area 12 is greater than the distance between the sidewall mirrors 21 adjacent the light emitting area 16.

The sidewall mirrors 21 are shown to be pivoted around pivot or rotation axis 22. The pivot or rotation axis 22 is arranged at a distance h from the light emitting area 16 which corresponds to the half distance H between the light emitting area 16 and the test area 12. The distance H between the light emitting area 16 and the test area 12 lies between 300 mm to 500 mm, preferably between 350 mm to 450 mm.

The distance B of the center of the LED-modules 17A arranged adjacent to the sidewall mirrors 21 and the rotation axis 22 of the respective sidewall mirror 21 lies in a range between 24% to 40% of the pitch P between the LED-modules 17, 17A.

In an alternative embodiment the sidewall mirrors 21 are pivotable around pivot or rotation axis 22 and the guides 26 are moveable along the plane A of the test area 12. Such a solar testing device is adjustable and solar cells or solar modules 6 with different dimensions, e.g. width, can be tested with the one and the same solar testing device.

After positioning a solar cell or solar module 6 on the solar testing device 11 a closed box is formed. Therefore, when testing the solar cell or solar module 6 no incidence of ambient light influences the test results.

Figure 4:
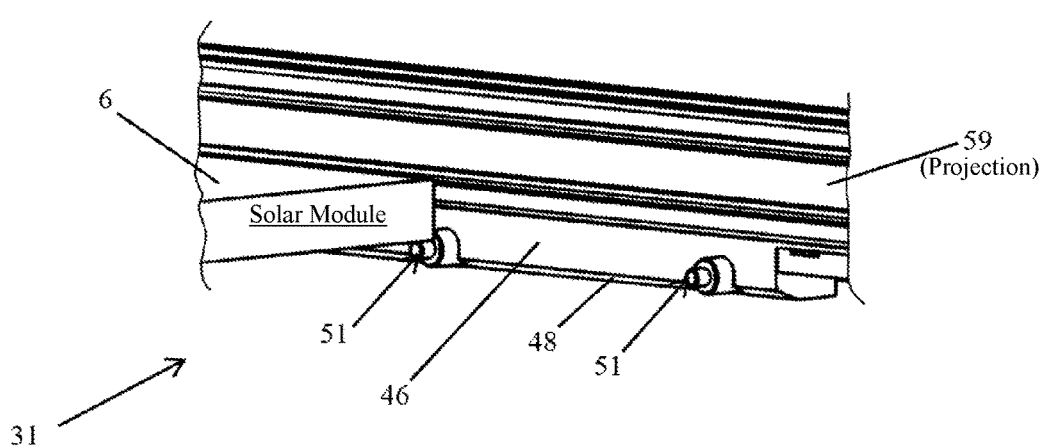
Figure 5:
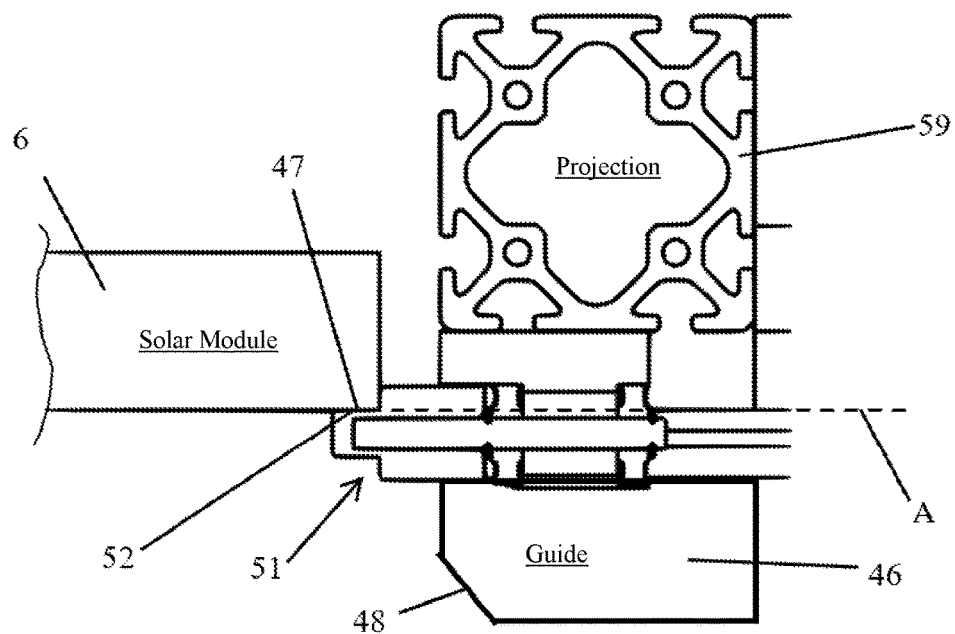

In the embodiment of the inventive solar testing device 31 shown in FIGS. 4 and 5 the guides 46 comprise rollers 51, whereby—in this drawings upper part of—the outer circumferential surface 52 of the rollers 51 form an abutting surface 47. The test area plane A runs tangential to the rollers 51 and parallel to the light emitting area (here not shown).

The guide 46 has a reflecting surface 48 facing the light emitting area and making an angle with that light emitting area. The angle α of the reflecting surface 48 to the light emitting area, whereby this angle α has the same value as the angle between the reflecting surface 48 and the abutting surface 47, is equal or lower than 45°, preferably lower than 25°.

In this embodiment the projection 59 are made from strand casting profiles, e.g. aluminum strand casting profiles.

Figure 6:
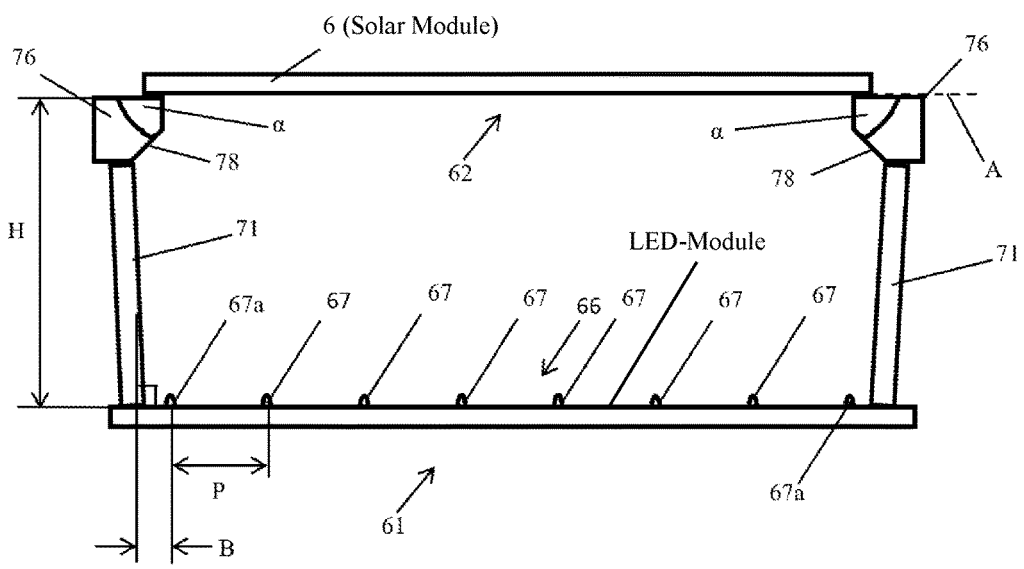

In the embodiment of the inventive solar testing device 61 shown in FIG. 6 the guides 76 have general rectangular cross section whereby on edge of the rectangular cross section is cut off. The resulting inclined portion forms the reflecting surface or reflecting surface portion 78 of the guide 76 which is inclined in respect to the light emitting area 66.

| List of Reference Marks | |
| --- | --- |
| 6 | solar module |
| 11 | solar testing device |
| 12 | test area |
| 16 | light emitting area |
| 17, 17A | LED-module |
| 21 | sidewall mirror |
| 22 | rotation axis |
| 26 | guide |
| 27 | abutting surface |
| 28 | reflecting surface |
| 29 | projection |
| 31 | solar testing device |
| 46 | guide |
| 47 | abutting surface |
| 48 | reflecting surface |
| 51 | rollers |
| 52 | outer circumferential surface |
| A | test area plane |
| B | distance between 17A and 21 or 67A and 71 |
| H | distance between 16 and 12 or 76 and 62 |
| h | half distance H |
| P | pitch between 17A and 17 or 67A and 67 |
| 59 | projection |
| 61 | solar testing device |
| 62 | test area |
| 66 | light emitting area |
| 67, 67a | LED-module |
| 71 | sidewall mirror |
| 76 | guide |
| 78 | reflecting surface |

What is claimed is:

1. A solar testing device for testing a solar cell or a solar module comprising:
   a test area for at least one solar cell or solar module to be tested,
   a light emitting area, arranged opposite to the test area, comprising:
      an array of LED-modules arranged with a pitch (P) to each other, and
      sidewall mirrors, extending in a direction from the light emitting area to the test area, the reflecting surface of said sidewall mirrors being inclined at an obtuse angle relative to a planar surface of the light emitting area,
   wherein a ratio between the distance (H) between the light emitting area and the test area and the pitch (P) of the LED-modules lies in a range of 1.5 to 3.5.

2. The solar testing device according to claim 1, wherein the obtuse angle is 91° to 95°.

3. The solar testing device according to claim 2, wherein the sidewall mirrors are pivoted around a pivot or rotation axis, and arranged at a distance (h) corresponding to a half of the distance (H) between the light emitting area and the test area.

4. The solar testing device according to claim 2, wherein a distance (B) between a center of the LED-module arranged adjacent to the sidewall mirrors and the rotation axis of the mirrors lies in a range between 24% to 40% of the pitch (P) between the LED-modules.

5. The solar testing device according claim 2, wherein the distance (H) between the light emitting area and the test area lies between 300 mm to 500 mm.

6. The solar testing device according to claim 2, wherein the pitch (P) between the LED-modules lies between 148 mm to 168 mm.

7. The solar testing device according to claim 2, wherein the obtuse angle is 92° to 94°.

8. The solar testing device according to claim 1, wherein the sidewall mirrors are pivoted around a pivot or rotation axis, and arranged at a distance (h) corresponding to a half of the distance (H) between the light emitting area and the test area.

9. The solar testing device according to claim 8, wherein a distance (B) between a center of the LED-module arranged adjacent to the sidewall mirrors and the rotation axis of the mirrors lies in a range between 24% to 40% of the pitch (P) between the LED-modules.

10. The solar testing device according claim 8, wherein the distance (H) between the light emitting area and the test area lies between 300 mm to 500 mm.

11. The solar testing device according to claim 8, wherein the pitch (P) between the LED-modules lies between 148 mm to 168 mm.

12. The solar testing device according to claim 1, wherein a distance (B) between a center of the LED-module arranged adjacent to the sidewall mirrors and a rotation axis of the mirrors lies in a range between 24% to 40% of the pitch (P) between the LED-modules.

13. The solar testing device according to claim 12, wherein the distance (H) between the light emitting area and the test area lies between 300 mm to 500 mm.

14. The solar testing device according to claim 12, wherein the pitch (P) between the LED-modules lies between 148 mm to 168 mm.

15. The solar testing device according to claim 1, wherein the distance (H) between the light emitting area and the test area lies between 300 mm to 500 mm.

16. The solar testing device according to claim 15, wherein the pitch (P) between the LED-modules lies between 148 mm to 168 mm.

17. The solar testing device according to claim 1, wherein the pitch (P) between the LED-modules lies between 148 mm to 168 mm.

* * * * *